us007244951B2

(12) United States Patent
Tazaki (10) Patent No.: US 7,244,951 B2
(45) Date of Patent: Jul. 17, 2007

(54) STIMULABLE PHOSPHOR PANEL (75) Inventor: Seiji Tazaki, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 16 days.

(21) Appl. No.: 10/370,531

(22) Filed: Feb. 24, 2003

(65) Prior Publication Data

US 2003/0160188 A1   Aug. 28, 2003

(30) Foreign Application Priority Data

Feb. 25, 2002   (JP) .............................. 2002-048378

(51) Int. Cl.
*H05B 33/04* (2006.01)
(52) U.S. Cl. ............... 250/484.4; 250/484.2; 250/483.1; 250/472.1
(58) Field of Classification Search .......... 250/484.4, 250/484.2, 483.1, 472.1
See application file for complete search history.

(56) References Cited

U.S. PATENT DOCUMENTS 5,023,461 A * 6/1991 Nakazawa et al. ....... 250/484.4

FOREIGN PATENT DOCUMENTS

JP        11249243 A   *  9/1999

* cited by examiner

*Primary Examiner*—David Porta
*Assistant Examiner*—Christine Sung
(74) *Attorney, Agent, or Firm*—Sughrue Mion, PLLC

(57) ABSTRACT

A stimulable phosphor panel comprises a substrate having rigidity, a stimulable phosphor layer, and a transparent water vapor proof cover, which are overlaid one upon another in this order. The stimulable phosphor layer is accommodated and sealed within an enclosed region, which is enclosed between the substrate and the transparent water vapor proof cover. An expansible and contractible buffer space is formed so as to be in communication with the enclosed region. The buffer space has a volume falling within the range of 1/10 times to two times as large as the volume of the space within the enclosed region. The transparent water vapor proof cover may be constituted of a deformable film, and the buffer space may be formed by the utilization of a certain area of the transparent water vapor proof cover.

21 Claims, 10 Drawing Sheets

PRIOR ART

FIG.11

PRIOR ART

STIMULABLE PHOSPHOR PANEL

BACKGROUND OF THE INVENTION

1. Field of the Invention

This invention relates to a stimulable phosphor panel. This invention particularly relates to a stimulable phosphor panel provided with a water vapor proof cover, which seals a stimulable phosphor layer.

2. Description of the Related Art

Radiation image recording and reproducing systems utilizing stimulable phosphors have heretofore been known as computed radiography (CR). The radiation image recording and reproducing systems utilizing the stimulable phosphors comprise a radiation image recording apparatus for irradiating radiation carrying image information of an object, such as a human body, and storing a radiation image of the object as a latent image on a layer of the stimulable phosphor. The radiation image recording and reproducing systems utilizing the stimulable phosphors also comprise a radiation image read-out apparatus for exposing the stimulable phosphor layer, on which the latent image of the radiation image has been stored, to stimulating rays, such as a laser beam, which cause the stimulable phosphor layer to emit light in proportion to the amount of energy stored on the stimulable phosphor layer during the exposure of the stimulable phosphor layer to the radiation, and photoelectrically detecting the emitted light in order to acquire an image signal representing the radiation image of the object.

As recording media utilized in the aforesaid radiation image recording and reproducing systems, stimulable phosphor panels comprising a substrate having rigidity, a stimulable phosphor layer, and a protective layer, which are overlaid one upon another in a layer form, have been known. After image signals have been detected from the stimulable phosphor panels, the stimulable phosphor panels are exposed to erasing light, and energy remaining on the stimulable phosphor layers is thus erased. The erased stimulable phosphor panels are then capable of being used again for the recording of radiation images. In this manner, the stimulable phosphor panels are capable of being used repeatedly for the recording and readout of radiation images.

Also, the stimulable phosphor panels are used for a plurality of times of radiation image recording and read-out operations over a long period of time. Therefore, it is necessary that the stimulable phosphor panels be protected from deterioration due to external physical and chemical attacks. In particular, certain kinds of stimulable phosphors constituting the stimulable phosphor layers are apt to absorb moisture, and the radiation image recording and read-out performance becomes bad markedly due to the moisture absorption of the stimulable phosphors. Therefore, in order for such problems to be eliminated, a stimulable phosphor panel has heretofore been proposed, wherein a transparent material having water vapor proof characteristics is utilized as a transparent water vapor proof cover acting as the protective layer, and the stimulable phosphor layer is enclosed and sealed between the transparent water vapor proof cover and the substrate.

However, in cases where the stimulable phosphor panel described above, wherein the stimulable phosphor layer is enclosed and sealed between the transparent water vapor proof cover and the substrate, is used at the high ground, at which the atmospheric pressure is low, or under environmental conditions of high temperatures, the problems often occur in that a gas contained in an enclosed region between the transparent water vapor proof cover and the substrate expands and causes an increase in a spacing between adjacent layers or distortion of the stimulable phosphor layer to occur.

If the spacing between the transparent water vapor proof cover and the stimulable phosphor layer becomes large, the problems will occur in that, when the stimulating rays are irradiated to the stimulable phosphor layer via the transparent water vapor proof cover during the readout of the radiation image from the stimulable phosphor layer, on which the radiation image has been stored, the stimulating rays are reflected repeatedly between the stimulable phosphor layer and the transparent water vapor proof cover, and the exposure area of the stimulable phosphor layer exposed to the stimulating rays becomes wide.

Figure 3:
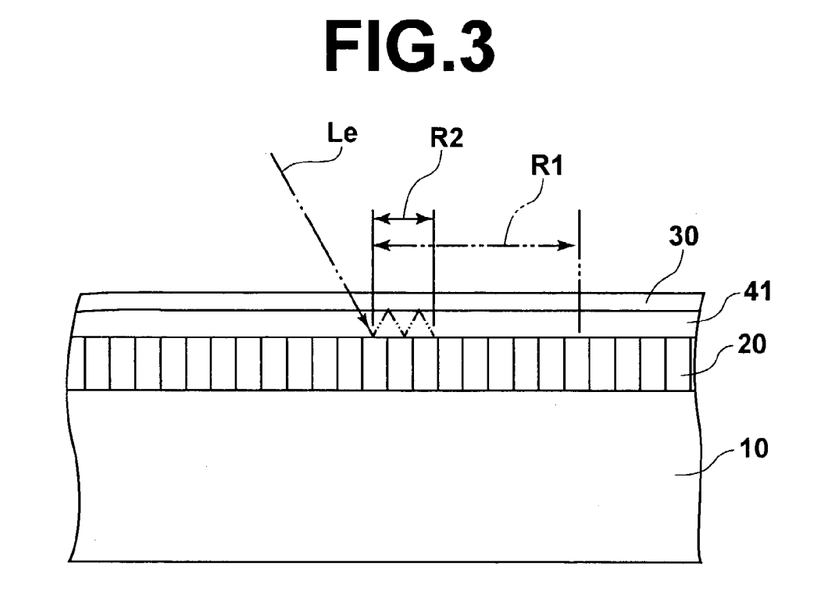
FIG. 3 is an explanatory side sectional view showing how stimulating rays spread due to repeated reflection of the stimulating rays in cases where a spacing between a stimulable phosphor layer and a water vapor proof film has not become large, in which view, as an aid in facilitating the explanation, a close contact interfacial boundary between the stimulable phosphor layer and the water vapor proof film is illustrated as if the boundary had a certain thickness.
Figure 11:
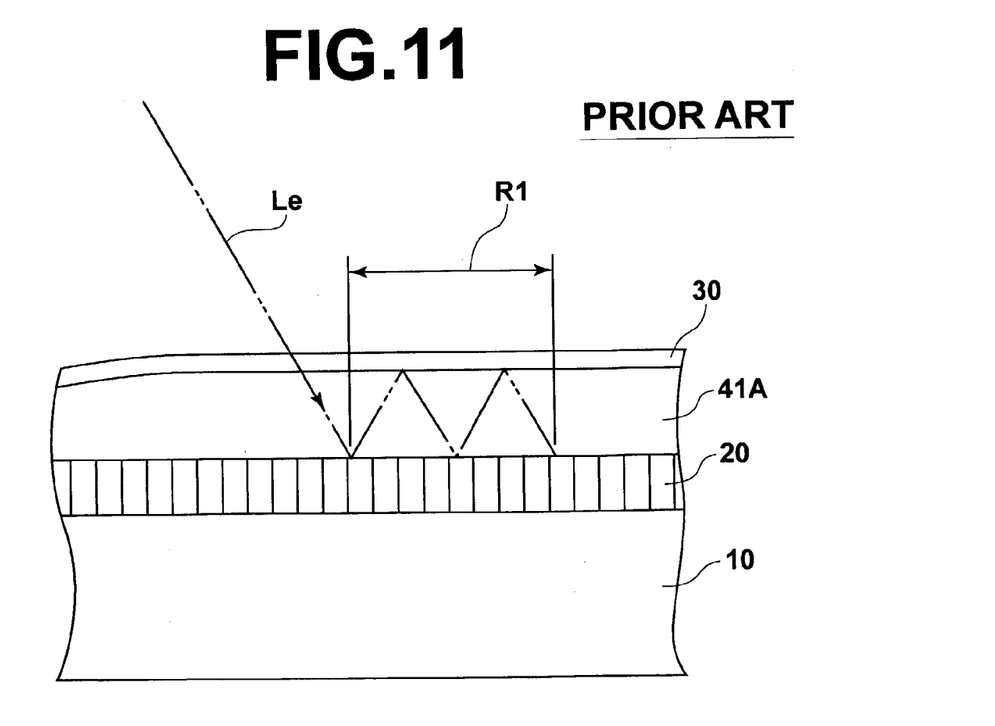
FIG. 11 is an explanatory side sectional view showing how stimulating rays spread due to repeated reflection of the stimulating rays in cases where a spacing between the stimulable phosphor layer and the water vapor proof film of the conventional stimulable phosphor panel has become large.

FIG. 11 is an explanatory side sectional view showing how stimulating rays spread due to repeated reflection of the stimulating rays in cases where a spacing between the stimulable phosphor layer and a water vapor proof film becomes large. Specifically, as illustrated in FIG. 11, in cases where the spacing between a stimulable phosphor layer 20 and a water vapor proof film 30 acting as the transparent water vapor proof cover becomes large, and a space 41A has thus occurred between the stimulable phosphor layer 20 and the water vapor proof film 30, a distance of propagation of stimulating rays Le due to one time of reflection between the water vapor proof film 30 and the stimulable phosphor layer 20 becomes long, and therefore the stimulating rays Le having been reflected between the water vapor proof film 30 and the stimulable phosphor layer 20 spreads over a range of an area R1. FIG. 3 is an explanatory side sectional view showing how stimulating rays spread due to repeated reflection of the stimulating rays in cases where a spacing between a stimulable phosphor layer and a water vapor proof film has not become large, in which view, as an aid in facilitating the explanation, a close contact interfacial boundary between the stimulable phosphor layer and the water vapor proof film is illustrated as if the boundary had a certain thickness. As illustrated in FIG. 3, in cases where the spacing between the stimulable phosphor layer 20 and the water vapor proof film 30 acting as the transparent water vapor proof cover are in close contact with each other or close to each other, the distance of propagation of the stimulating rays Le due to one time of reflection between the water vapor proof film 30 and the stimulable phosphor layer 20 is short, and therefore the stimulating rays Le having been reflected between the water vapor proof film 30 and the stimulable phosphor layer 20 spreads over a range of an area R2, which is narrower than the area R1 described above. Accordingly, in cases where the stimulating rays Le are reflected the same times between the water vapor proof film 30 and the stimulable phosphor layer 20, the exposure area of the stimulable phosphor layer 20, which is exposed to the stimulating rays Le in cases where the spacing between the stimulable phosphor layer 20 and the water vapor proof film 30 is large, becomes wider than the exposure area of the stimulable phosphor layer 20, which is exposed to the stimulating rays Le in cases where the spacing between the stimulable phosphor layer 20 and the water vapor proof film 30 is small.

Therefore, in the cases of FIG. 11, the light is emitted by the stimulable phosphor layer 20 with the effect identical with the effect occurring when the stimulable phosphor layer 20 is exposed to the stimulating rays having a large beam diameter corresponding to the wide area R1. As a result, the problems occur in that the light emitted from the wide area R1 of the stimulable phosphor layer 20 containing an area other than a predetermined detection range is detected, and the image sharpness of the radiation image represented by the thus acquired image signal becomes low.

Figure 14:
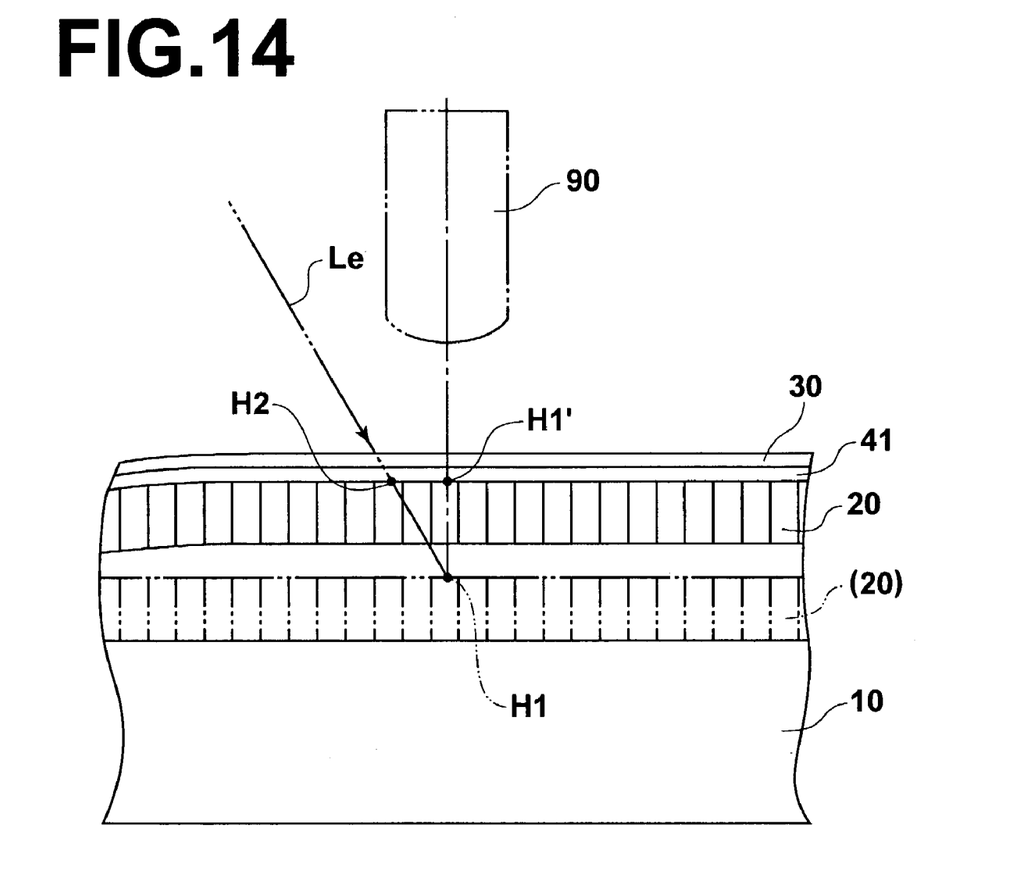
FIG. 14 is an explanatory side sectional view showing how a radiation image is read out from a distorted stimulable phosphor layer.

FIG. 14 is an explanatory side sectional view showing how a radiation image is read out from a distorted stimulable phosphor layer. As illustrated in FIG. 14, in cases where the stimulable phosphor layer has been distorted due to expansion of the gas contained in the enclosed region, when the stimulating rays Le are irradiated to the stimulable phosphor layer 20, the stimulating rays Le impinge upon a position H2 on the distorted stimulable phosphor layer 20, the position H2 being shifted from a predetermined position H1, upon which the stimulating rays Le impinge in cases where the stimulable phosphor layer 20 has not been distorted. Also, the stimulating rays Le, which are to be irradiated to the predetermined position H1 on the stimulable phosphor layer 20 having not been distorted (i.e., a position H1' on the distorted stimulable phosphor layer 20), impinge upon the position H2 on the distorted stimulable phosphor layer 20, which position H2 is shifted from the predetermined position H1, and the light emitted from the position H2 is detected by detecting means 90, which has been set so as to detect the light emitted from the predetermined position H1. As a result, the efficiency, with which the emitted light is collected by the detecting means 90, becomes low. Further, since the light emission position alters to the position H2 shifted from the predetermined position H1'(the predetermined position H1) on the stimulable phosphor layer 20, the radiation image represented by the image signal acquired from the shifted position H2 becomes a distorted image. Accordingly, the radiation image having been stored on the stimulable phosphor layer 20 cannot be read out accurately.

SUMMARY OF THE INVENTION

The primary object of the present invention is to provide a stimulable phosphor panel, wherein water vapor absorption of a stimulable phosphor layer is prevented from occurring, and a lowering of quality of an image signal read out from the stimulable phosphor layer is suppressed even in cases where a change in ambient temperature or atmospheric pressure occurs.

The present invention provides a stimulable phosphor panel, comprising:

i) a substrate having rigidity,
ii) a stimulable phosphor layer, and
iii) a transparent water vapor proof cover, the substrate, the stimulable phosphor layer, and the transparent water vapor proof cover being overlaid one upon another in this order, the stimulable phosphor layer being accommodated and sealed within an enclosed region, which is enclosed between the substrate and the transparent water vapor proof cover, wherein the improvement comprises the provision of an expansible and contractible buffer space, which is in communication with the enclosed region.

The stimulable phosphor panel in accordance with the present invention should preferably be modified such that the buffer space has a volume falling within the range of 1/10 times as large as the volume of the space within the enclosed region to two times as large as the volume of the space within the enclosed region. The buffer space should preferably have a volume falling within the range of one times as large as the volume of the space within the enclosed region to two times as large as the volume of the space within the enclosed region.

Also, the stimulable phosphor panel in accordance with the present invention may be modified such that the buffer space is formed by a variable capacity cylinder, which has water vapor proof characteristics, or an expansible and contractible bag-shaped member, which has water vapor proof characteristics. Further, the stimulable phosphor panel in accordance with the present invention should preferably be modified such that the buffer space and the space within the enclosed region are filled with dry air or an inert gas.

Furthermore, the stimulable phosphor panel in accordance with the present invention may be modified such that the transparent water vapor proof cover is constituted of a deformable film, and the buffer space is formed by the utilization of a certain area of the transparent water vapor proof cover.

The term "volume of a space within an enclosed region" as used herein means the volume also containing voids located within the stimulable phosphor layer.

The stimulable phosphor panel in accordance with the present invention is provided with the expansible and contractible buffer space, which is in communication with the enclosed region formed between the substrate and the transparent water vapor proof cover. Therefore, with the stimulable phosphor panel in accordance with the present invention, in cases where there occurs the tendency of the pressure within the enclosed region to become high due to a lowering of the pressure of the ambient atmosphere or rising of the temperature of the stimulable phosphor panel, the gas expanded within the enclosed region moves into the expansible and contractible buffer space and is absorbed by the expansion of the expansible and contractible buffer space. Accordingly, an increase in spacing between the substrate and the stimulable phosphor layer and spacing between the stimulable phosphor layer and the transparent water vapor proof cover due to the expansion of the gas contained in the enclosed region is capable of being suppressed. Also, deformation of the stimulable phosphor layer due to the expansion of the gas contained in the enclosed region is capable of being suppressed. As a result, even if a change in temperature and atmospheric pressure occurs, a lowering of quality of an image signal read out from the stimulable phosphor layer is capable of being suppressed, while the water vapor absorption of the stimulable phosphor layer is being prevented from occurring.

The stimulable phosphor panel in accordance with the present invention may be modified such that the buffer space has a volume falling within the range of 1/10 times as large as the volume of the space within the enclosed region to two times as large as the volume of the space within the enclosed region. With the modification described above, in cases where a change in temperature and atmospheric pressure occurs, the effect of suppressing the lowering of quality of the image signal read out from the stimulable phosphor layer is capable of being obtained, and the size of the stimulable phosphor panel is capable of being kept at a comparatively small size, which does not cause any problem with regard to the processing of the stimulable phosphor panel. Also, in cases where the buffer space has a volume falling within the range of one times as large as the volume of the space within the enclosed region to two times as large as the volume of the space within the enclosed region, the gas expanded within the enclosed region is capable of being more reliably absorbed by the buffer space, and the effects described above are capable of being obtained more reliably.

With the stimulable phosphor panel in accordance with the present invention, wherein the buffer space is formed by the variable capacity cylinder, which has the water vapor proof characteristics, or the expansible and contractible bag-shaped member, which has the water vapor proof characteristics, the gas expanded within the enclosed region is capable of being more reliably moved into the buffer space.

With the stimulable phosphor panel in accordance with the present invention, wherein the transparent water vapor proof cover is constituted of the deformable film, and the buffer space is formed by the utilization of a certain area of the transparent water vapor proof cover, the constitution of the stimulable phosphor panel is capable of being simplified even further.

With stimulable phosphor panel in accordance with the present invention, wherein the buffer space and the space within the enclosed region are filled with dry air or an inert gas, the water vapor absorption of the stimulable phosphor layer is capable of being more reliably prevented from occurring.

DESCRIPTION OF THE PREFERRED EMBODIMENTS

The present invention will hereinbelow be described in further detail with reference to the accompanying drawings.

Figure 1A:
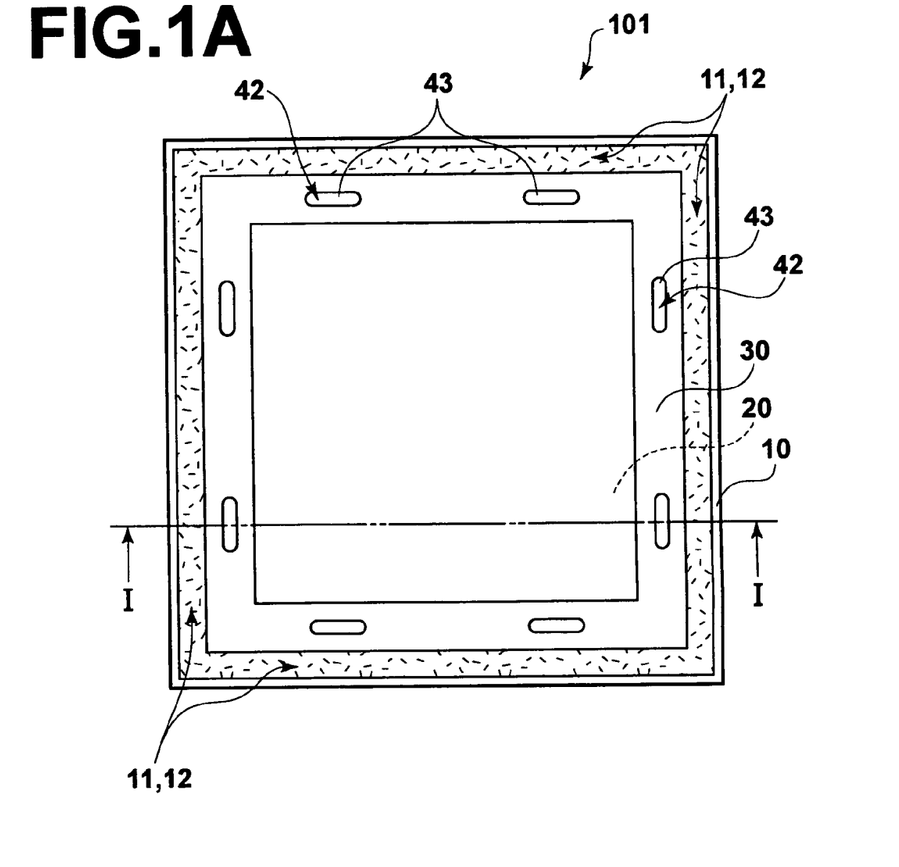
FIG. 1A is a schematic plan view showing a first embodiment of the stimulable phosphor panel in accordance with the present invention.
Figure 1B:
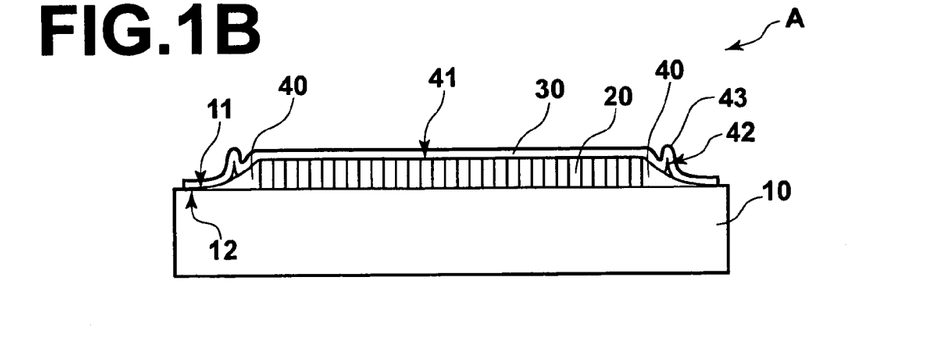
FIG. 1B is a sectional view taken on line I—I of FIG. 1A.
Figure 2A:
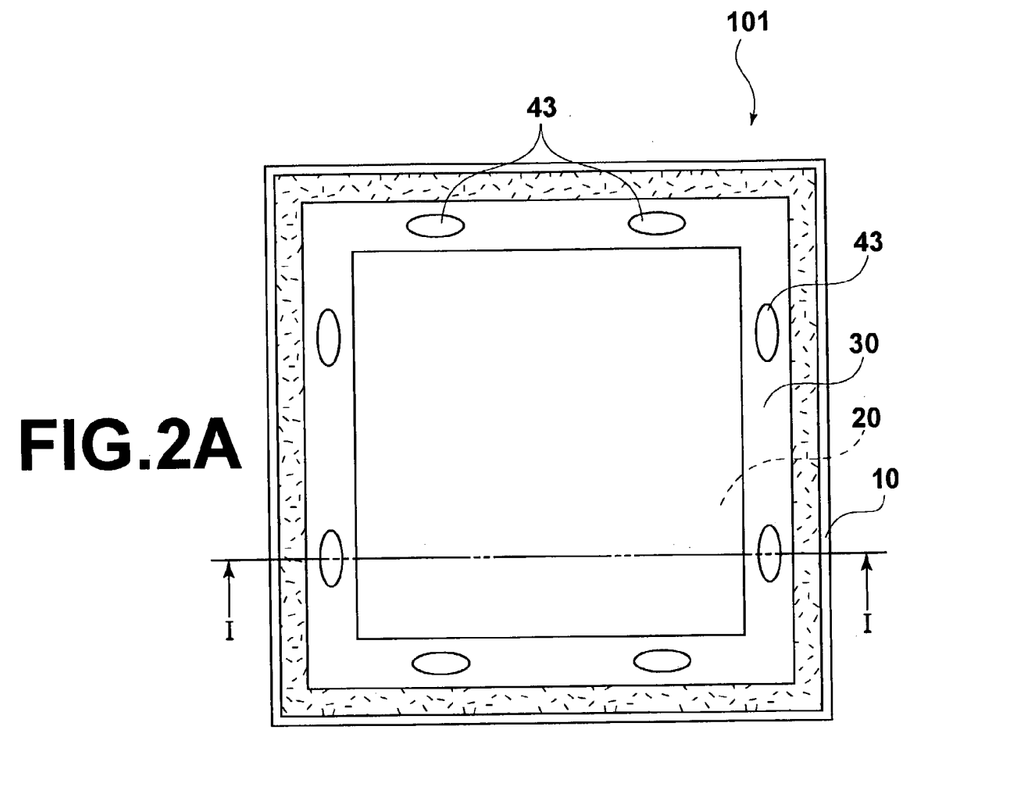
FIG. 2A is a schematic plan view showing the stimulable phosphor panel of FIG. 1A in a state, in which a gas contained in an enclosed region has moved into buffer spaces.
Figure 2B:
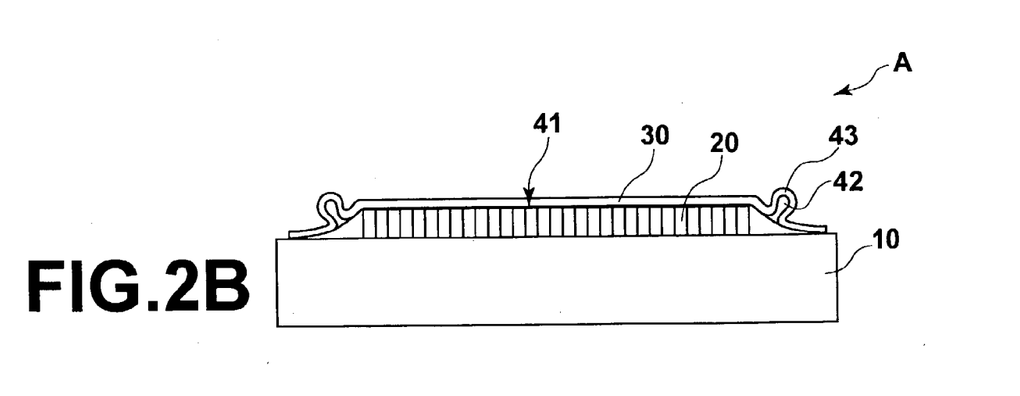
FIG. 2B is a sectional view taken on line I—I of FIG. 2A.
Figure 4:
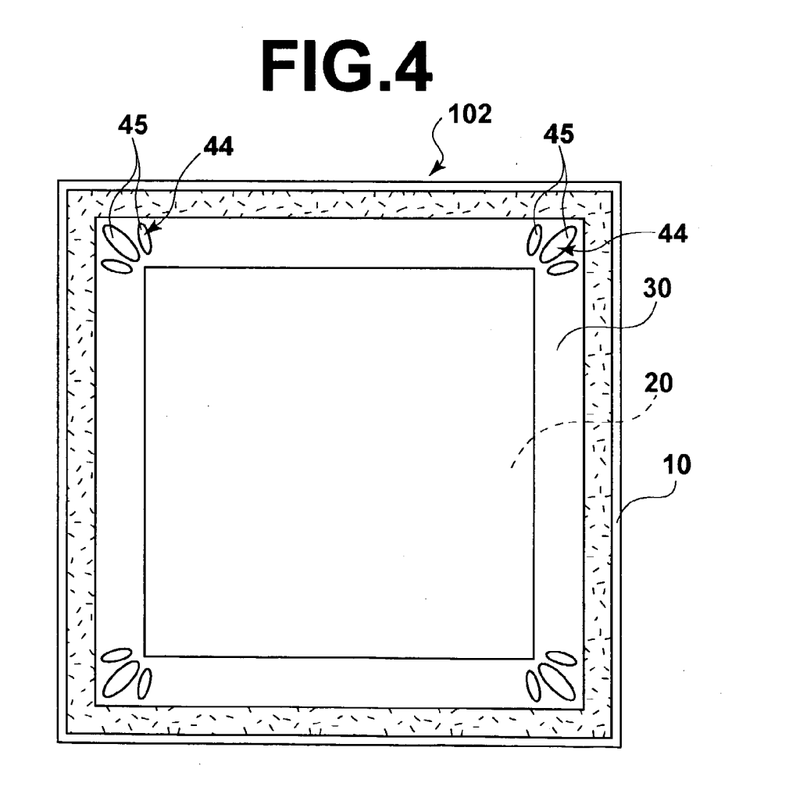
FIG. 4 is a schematic plan view showing a second embodiment of the stimulable phosphor panel in accordance with the present invention, in which the buffer spaces are formed at four corner areas of a transparent water vapor proof cover.
Figure 5A:
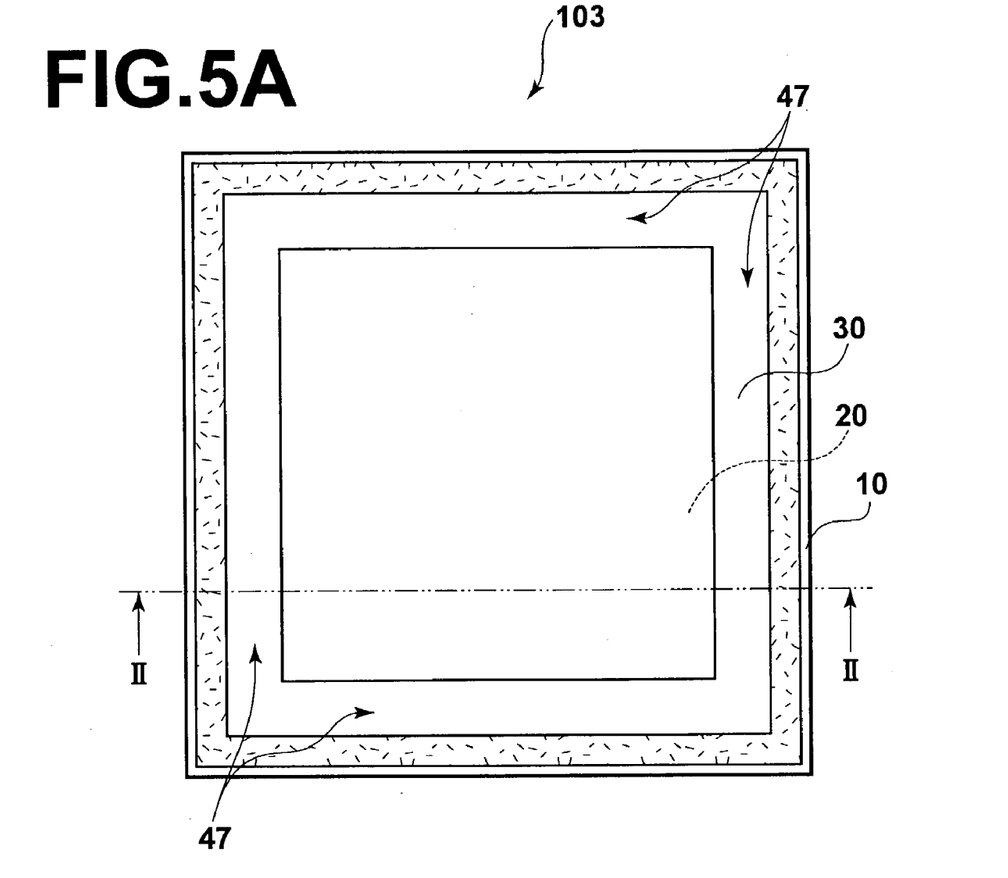
FIG. 5A is a schematic plan view showing a third embodiment of the stimulable phosphor panel in accordance with the present invention, in which the buffer spaces are formed at slant areas of a transparent water vapor proof cover.
Figure 5B:
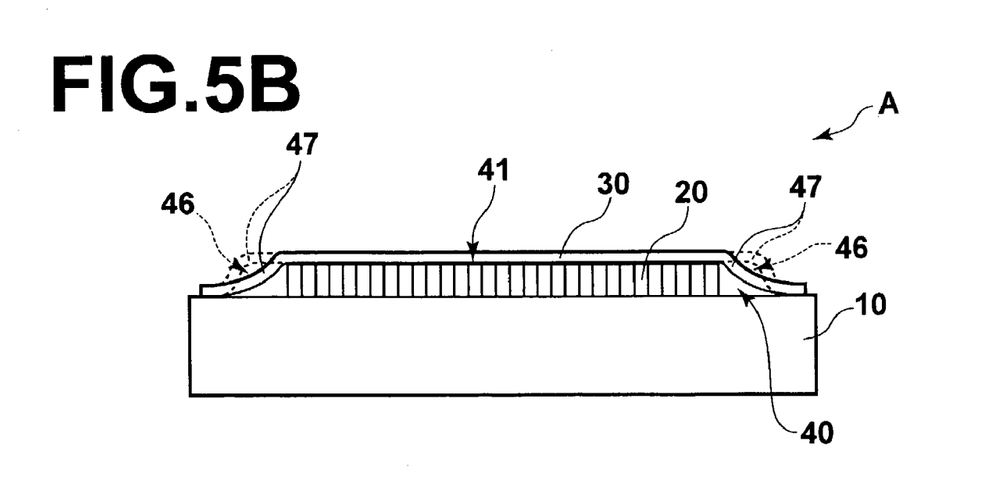
FIG. 5B is a sectional view taken on line II—II of FIG. 5A.
Figure 6A:
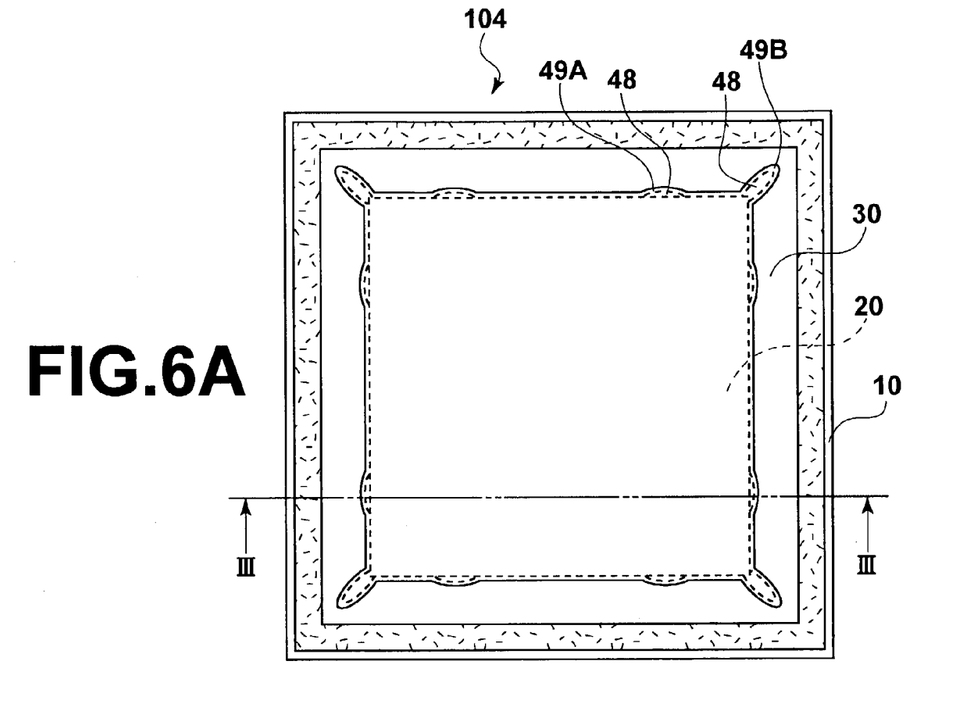
FIG. 6A is a schematic plan view showing a fourth embodiment of the stimulable phosphor panel in accordance with the present invention, in which a transparent water vapor proof cover is located along side faces of a stimulable phosphor layer, and the buffer spaces are formed between the side faces of the stimulable phosphor layer and the transparent water vapor proof cover.
Figure 6B:
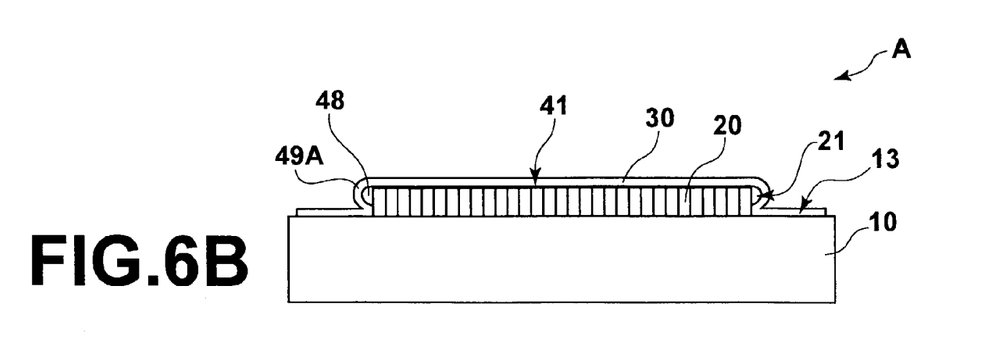
FIG. 6B is a sectional view taken on line III—III of FIG. 6A.
Figure 10:
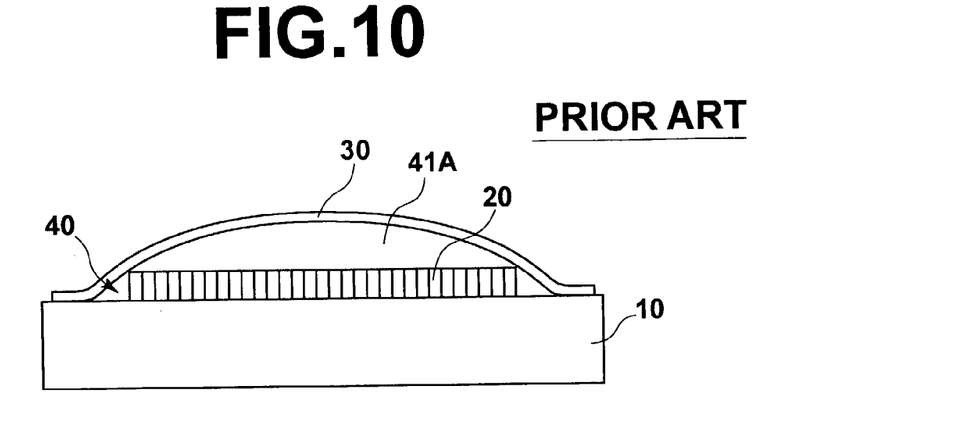
FIG. 10 is an explanatory side sectional view showing a conventional stimulable phosphor panel in a state, in which a spacing between a stimulable phosphor layer and a water vapor proof film has become large.

FIG. 1A is a schematic plan view showing a first embodiment of the stimulable phosphor panel in accordance with the present invention. FIG. 1B is a sectional view taken on line I—I of FIG. 1A. FIG. 2A is a schematic plan view showing the stimulable phosphor panel of FIG. 1A in a state, in which a gas contained in an enclosed region has moved into buffer spaces. FIG. 2B is a sectional view taken on line I—I of FIG. 2A. FIG. 3 is an explanatory side sectional view showing how stimulating rays spread due to repeated reflection of the stimulating rays in cases where a spacing between a stimulable phosphor layer and a water vapor proof film has not become large, in which view, as an aid in facilitating the explanation, a close contact interfacial boundary between the stimulable phosphor layer and the water vapor proof film is illustrated as if the boundary had a certain thickness. FIG. 4 is a schematic plan view showing a second embodiment of the stimulable phosphor panel in accordance with the present invention, in which the buffer spaces are formed at four corner areas of a transparent water vapor proof cover. FIG. 5A is a schematic plan view showing a third embodiment of the stimulable phosphor panel in accordance with the present invention, in which the buffer spaces are formed at slant areas of a transparent water vapor proof cover. FIG. 5B is a sectional view taken on line II—II of FIG. 5A. FIG. 6A is a schematic plan view showing a fourth embodiment of the stimulable phosphor panel in accordance with the present invention, in which a transparent water vapor proof cover is located along side faces of a stimulable phosphor layer, and the buffer spaces are formed between the side faces of the stimulable phosphor layer and the transparent water vapor proof cover. FIG. 6B is a sectional view taken on line III—III of FIG. 6A. FIG. 10 is an explanatory side sectional view showing a conventional stimulable phosphor panel in a state, in which a spacing between a stimulable phosphor layer and a water vapor proof film has become large due to expansion of a gas at a close contact interfacial boundary. FIG. 11 is an explanatory side sectional view showing how stimulating rays spread due to repeated reflection of the stimulating rays in cases where a spacing between the stimulable phosphor layer and the water vapor proof film of the conventional stimulable phosphor panel has become large.

With reference to FIGS. 1A and 1B, a stimulable phosphor panel 101, which is a first embodiment of the stimulable phosphor panel in accordance with the present invention, comprises a substrate 10, which has rigidity and is made from a glass material, an aluminum material, or the like. The stimulable phosphor panel 101 also comprises a stimulable phosphor layer 20, and a deformable water vapor proof film 30, which acts as a transparent water vapor proof cover. The substrate 10, the stimulable phosphor layer 20, and the water vapor proof film 30 are overlaid one upon another in this order. The stimulable phosphor layer 20 is accommodated and sealed within an enclosed region 40, which is enclosed between the substrate 10 and the water vapor proof film 30. Further, the stimulable phosphor panel 101 is provided with expansible and contractible buffer spaces 42, 42, . . . , which are in communication with the enclosed region 40.

The stimulable phosphor layer 20 has been formed on a surface of the substrate 10 with a vacuum evaporation technique or a coating technique. The surface of the stimulable phosphor layer 20, which surface is opposite to the surface that stands facing the substrate 10, is in close contact with the inner surface of the water vapor proof film 30. Specifically, the water vapor proof film 30 is adhered to the substrate 10, while the water vapor proof film 30 is receiving tensile force and being deformed elastically, and the inner surface of the water vapor proof film 30 and the surface of the stimulable phosphor layer 20 are brought into close contact with each other by counter force occurring with the water vapor proof film 30. In this manner, a close contact interfacial boundary 41 is formed between the stimulable phosphor layer 20 and the water vapor proof film 30.

The area of the overlaying surface of the substrate 10 having a quadrangular shape and the area of the overlaying surface of the water vapor proof film 30 are larger than the area of the overlaying surface of the stimulable phosphor layer 20 having a quadrangular shape. Peripheral areas 11, 11, . . . of the substrate 10 and peripheral areas 12, 12, . . . of the water vapor proof film 30 are adhered to each other, and the enclosed region 40 having a truncated regular quadrangular pyramid shape is thereby formed between the substrate 10 and the water vapor proof film 30.

Each of the buffer spaces 42, 42, . . . is formed by the utilization of a certain area of the water vapor proof film 30. A plurality of bag-shaped areas 43, 43, . . . are formed at the peripheral regions of the water vapor proof film 30 by use of a thermoforming technique, and each of the buffer spaces 42, 42, . . . is thus formed in one of the bag-shaped areas 43, 43, . . . of the water vapor proof film 30. As illustrated in FIGS. 1A and 1B, at the normal temperature and the normal pressure (i.e., 20° C. and 1 atm), the bag-shaped areas 43, 43, . . . of the water vapor proof film 30 are in a contracted state without being filled with a gas. In cases where the bag-shaped areas 43, 43, . . . of the water vapor proof film 30 come into an expanded state, in which the bag-shaped areas 43, 43, . . . are filled with the gas, the total volume of the bag-shaped areas 43, 43, . . . becomes 1/10 times as large as the volume of the space within the enclosed region 40.

The gas contained in the enclosed region 40 is dry air or an inert gas.

The total volume of the buffer spaces 42, 42, . . . and the volume of the space within the enclosed region 40 will be described hereinbelow.

The volume of the space within the enclosed region 40 is equal to the sum of the value, which is obtained by subtracting the volume of the stimulable phosphor layer 20 from the volume of the enclosed region 40, and the value of the total volume of voids, which are contained within the stimulable phosphor layer 20.

In this embodiment, the stimulable phosphor layer 20 has a size of 430 mm (vertical length)×430 mm (horizontal length)×0.5 mm (height). Therefore, the volume of the stimulable phosphor layer 20 is equal to 92.45 cm$^3$. Also, the volume of the enclosed region 40, i.e. the volume of the region having the truncated regular quadrangular pyramid shape, is equal to approximately 94.186 cm$^3$. Therefore, the value, which is obtained by subtracting the volume of the stimulable phosphor layer 20 from the volume of the enclosed region 40, is equal to approximately 1.7 cm$^3$. Also, the total volume of the voids, which are contained within the stimulable phosphor layer 20, occupies approximately 10% of the volume of the stimulable phosphor layer 20. Therefore, the total volume of the voids is equal to approximately 9.2 cm$^3$.

Accordingly, the volume of the space within the enclosed region 40 is equal to 1.7 cm$^3$+9.2 cm$^3$=10.9 cm$^3$.

The total volume of the buffer spaces 42, 42, . . . is the total sum of the volumes of the spaces within the plurality of the bag-shaped areas 43, 43, . . . in the state, in which the bag-shaped areas 43, 43, . . . have been filled with the gas. The total volume of the buffer spaces 42, 42, . . . is approximately 1/10 times as large as the volume of the space within the enclosed region 40, i.e. is equal to approximately 1.1 cm$^3$.

The effects of the aforesaid first embodiment of the stimulable phosphor panel in accordance with the present invention will be described hereinbelow. In this case, the stimulating rays are irradiated to the stimulable phosphor panel 101 from the side of the water vapor proof film 30, and the light emitted by the stimulable phosphor layer 20 of the stimulable phosphor panel 101, on which a radiation image has been stored, is detected from the side of the water vapor proof film 30.

The stimulating rays are irradiated via the water vapor proof film 30 to the stimulable phosphor layer 20, and the stimulable phosphor layer 20 is stimulated by the stimulating rays to emit the light. The light emitted by the stimulable phosphor layer 20 passes through the close contact interfacial boundary 41 and the water vapor proof film 30 and emanates to ambient air A. The emitted light is detected by detection means, and an image signal representing the radiation image having been stored on the stimulable phosphor layer 20 is thus acquired.

Effects of the expansible and contractible buffer spaces 42, 42, . . . , which are in communication with the enclosed region 40, will be described hereinbelow.

By way of example, in cases where the stimulable phosphor panel 101 is used under the conditions of the atmospheric pressure of 1 atm and a temperature of 50° C., the gas contained in the enclosed region 40 is expanded to a volume approximately 1.1 times as large as the original volume. Specifically, the volume of the gas contained in the enclosed region 40 increases by 1.09 cm$^3$ due to the expansion. The increase in gas volume by 1.09 cm$^3$ is absorbed by movement of the gas into the plurality of the bag-shaped areas 43, 43, . . . , which have the total volume of 1.1 cm$^3$. Therefore, the pressure within the enclosed region 40 and the bag-shaped areas 43, 43, . . . are kept 1 atm in accordance with the pressure of the ambient atmosphere. At this time, as illustrated in FIGS. 2A and 2B, the gas described above is taken into the buffer spaces 42, 42, . . . formed within the plurality of the bag-shaped areas 43, 43, . . . , and the bag-shaped areas 43, 43, . . . are thus expanded.

However, in cases where the stimulable phosphor panel is not provided with the bag-shaped areas 43, 43, . . . for forming the buffer spaces 42, 42, . . . and is used in the same environment as the environment described above, i.e. under the conditions of the atmospheric pressure of 1 atm and a temperature of 50° C., the problems described below occur. Specifically, the space within the enclosed region 40 comes into a pressurized state with respect to the ambient air. As a result, as illustrated in FIG. 10, the spacing between the water vapor proof film 30 and the stimulable phosphor layer 20 becomes large due to the expansion of the gas at the close contact interfacial boundary 41, and the space 41A occurs between the water vapor proof film 30 and the stimulable phosphor layer 20.

In the state described above, the stimulating rays are irradiated via the water vapor proof film 30 to the stimulable phosphor layer 20 for the readout of the radiation image from the stimulable phosphor panel. In such cases, the stimulating rays having been irradiated to the stimulable phosphor layer 20 are reflected repeatedly between the stimulable phosphor layer 20 and the water vapor proof film 30, while the stimulating rays are attenuating. At this time, as illustrated in FIG. 11, due to N times of repeated reflection of the stimulating rays Le between the stimulable phosphor layer 20 and the water vapor proof film 30, the stimulating rays Le spreads over the range of the area R1 As illustrated in FIG. 3, in cases where the stimulable phosphor layer 20 and the water vapor proof film 30 are in close contact with each other via the close contact interfacial boundary 41, and the stimulating rays Le are irradiated via the water vapor proof film 30 to the stimulable phosphor layer 20 in the manner described above, the stimulating rays Le spread over the range of the area R2 due to N times of repeated reflection of the stimulating rays Le between the stimulable phosphor layer 20 and the water vapor proof film 30, while the stimulating rays Le are attenuating. The area R1, over which the stimulating rays Le spread in the cases of FIG. 11, is wider than the area R2, over which the stimulating rays Le spread in the cases of FIG. 3, i.e. R1>R2.

As a result, in the cases of FIG. 11, the light is emitted by the stimulable phosphor layer 20 with the effect identical with the effect occurring when the stimulable phosphor layer 20 is exposed to the stimulating rays having a large beam diameter corresponding to the wide area R1 In this manner, emitted light components occurring from a plurality of sites falling within the wide area R1 on the stimulable phosphor layer 20 emanate simultaneously from the stimulable phosphor panel. In cases where the light is emitted from the wide area R1, the problems occur in that the energy having been stored on the stimulable phosphor layer 20 is exhausted uselessly due to the occurrence of the emitted light from the wide area R1 of the stimulable phosphor layer 20 containing the area other than the predetermined detection range, and the emitted light components occurring from the area other than the predetermined detection range enter as noise into the image signal. Therefore, the image sharpness of the radiation image represented by the image signal, which is obtained by detecting the emitted light occurring with the irradiation of the stimulating rays Le to the wide area R1, becomes lower than the image sharpness of the radiation image represented by the image signal, which is obtained by detecting the emitted light occurring with the irradiation of the stimulating rays Le to the area R2 narrower than the area R1.

In the first embodiment described above, the buffer spaces 42, 42, . . . are formed by the bag-shaped areas 43, 43, . . . of the water vapor proof film 30. Alternatively, the buffer spaces may be formed in various other ways. Specifically, as in a stimulable phosphor panel 102 illustrated in FIG. 4, which is a second embodiment of the stimulable phosphor panel in accordance with the present invention, buffer spaces 44, 44, . . . may be formed by utilizing a plurality of slack areas 45, 45, . . . of the water vapor proof film 30, which slack areas occur at the four corner areas of the quadrangular water vapor proof film 30 when the water vapor proof film 30 is adhered to the substrate 10, in lieu of the bag-shaped areas 43, 43, . . . described above. As another alternative, as in a stimulable phosphor panel 103 illustrated in FIG. 5A and FIG. 5B, which is a sectional view taken on line II—II of FIG. 5A, the stimulable phosphor panel 103 being a third embodiment of the stimulable phosphor panel in accordance with the present invention, buffer spaces 46, 46, . . . may be formed by utilizing slacks of slant areas 47, 47, . . . of the water vapor proof film 30, the slant areas being formed around the stimulable phosphor layer 20 and extending from the peripheral areas, at which the water vapor proof film 30 is adhered to the substrate 10, to the areas, at which the water vapor proof film 30 is brought into close contact with the surface of the stimulable phosphor layer 20.

As a further alternative, as in a stimulable phosphor panel 104 illustrated in FIG. 6A and FIG. 6B, which is a sectional view taken on line III—III of FIG. 6A, the stimulable phosphor panel 104 being a fourth embodiment of the stimulable phosphor panel in accordance with the present invention, the peripheral areas of the water vapor proof film 30 may be adhered to approximately the entire peripheral areas 13, 13, . . . of the surface of the substrate 10, which peripheral areas are not covered by the stimulable phosphor layer 20, such that the water vapor proof film 30 is located along the side faces 21, 21, . . . of the stimulable phosphor layer 20. In such cases, as in the cases described above, buffer spaces 48, 48, . . . having the same functions as those described above may be formed by utilizing bag-shaped areas 49A, 49A, . . . of the water vapor proof film 30, which bag-shaped areas are formed between the side faces 21, 21, . . . of the stimulable phosphor layer 20 and the water vapor proof film 30 by use of the thermoforming technique, and by utilizing slack areas 49B, 49B, . . . of the water vapor proof film 30, which slack areas occur at the four corner areas of the quadrangular water vapor proof film 30.

Figure 7A:
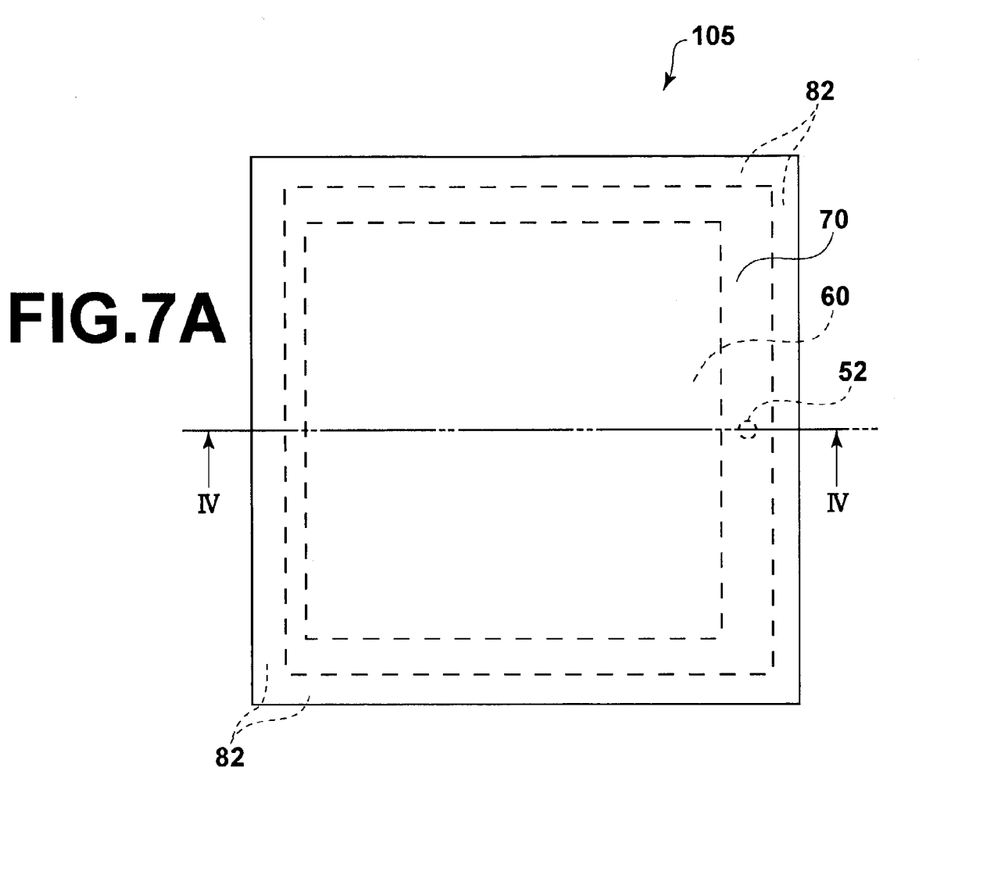
FIG. 7A is a schematic plan view showing a fifth embodiment of the stimulable phosphor panel in accordance with the present invention, which is provided with a variable capacity mechanism.
Figure 7B:
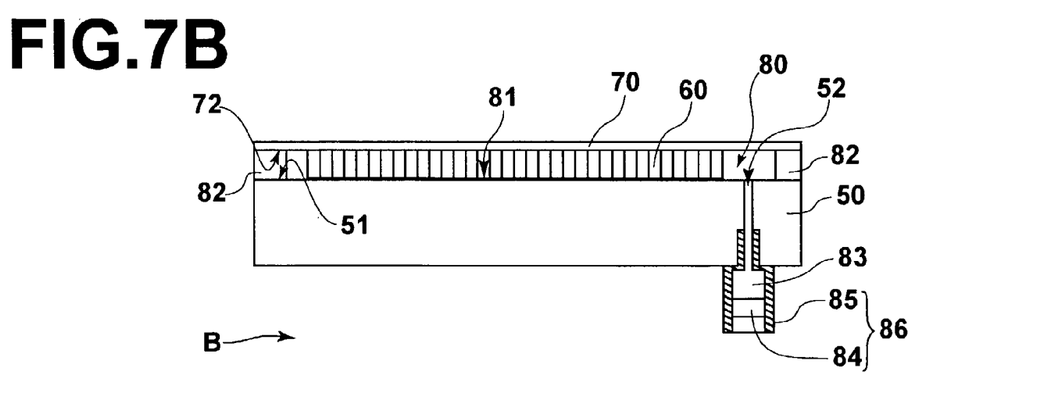
FIG. 7B is a sectional view taken on line IV—IV of FIG. 7A.
Figure 8:
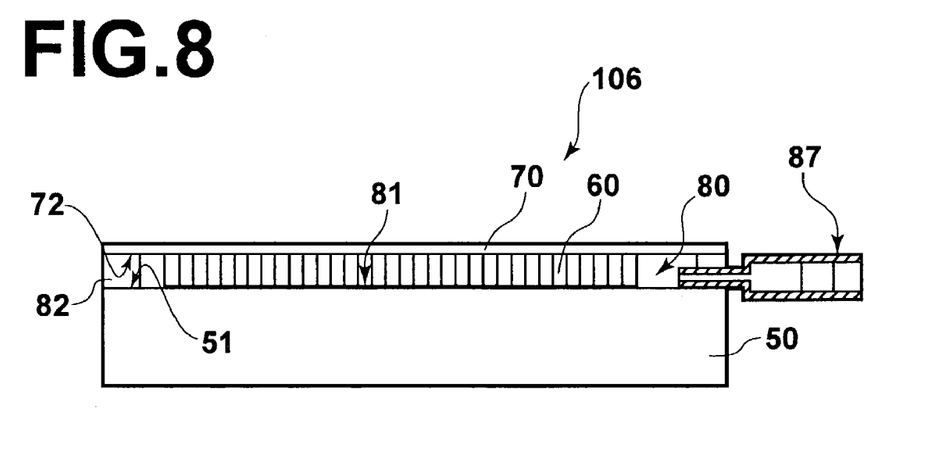
FIG. 8 is a schematic plan view showing a sixth embodiment of the stimulable phosphor panel in accordance with the present invention, which is provided with a variable capacity mechanism located so as to pass through a spacer frame.
Figure 9:
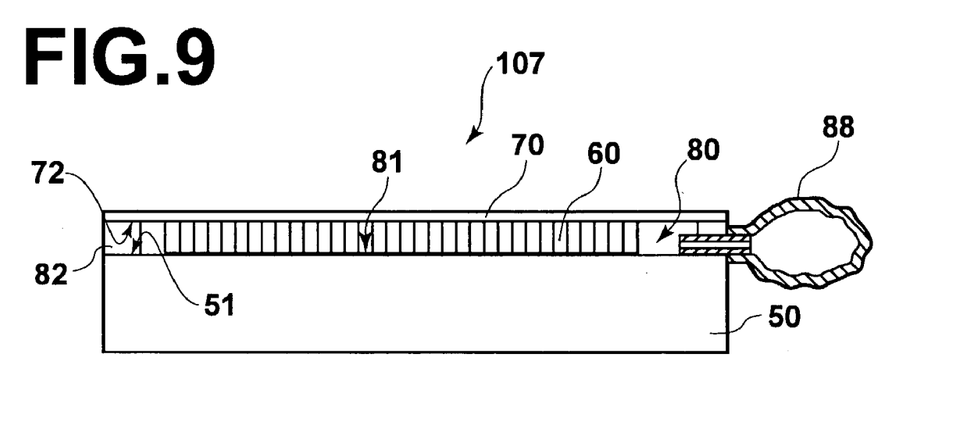
FIG. 9 is a schematic plan view showing a seventh embodiment of the stimulable phosphor panel in accordance with the present invention, which is provided with an expansible and contractible bag-shaped member located so as to pass through a spacer frame.
Figure 12:
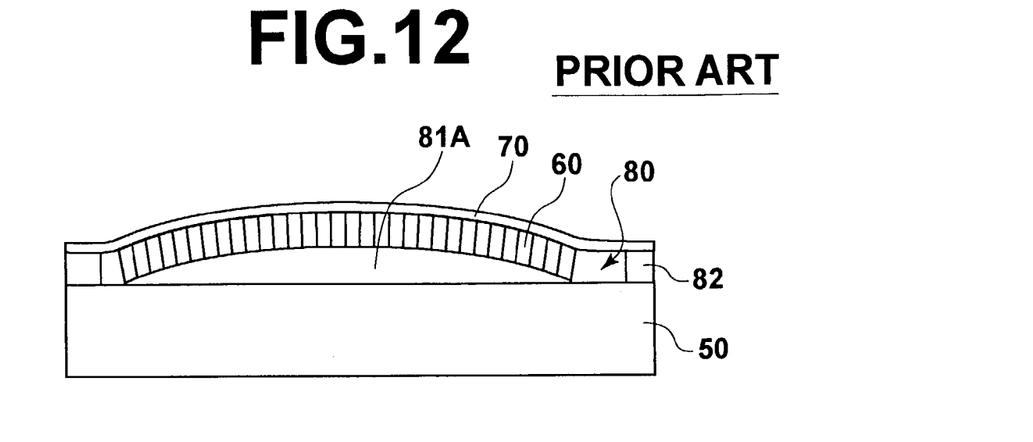
FIG. 12 is an explanatory side sectional view showing a conventional stimulable phosphor panel in a state, in which a spacing between a stimulable phosphor layer and a glass substrate has become large.
Figure 13:
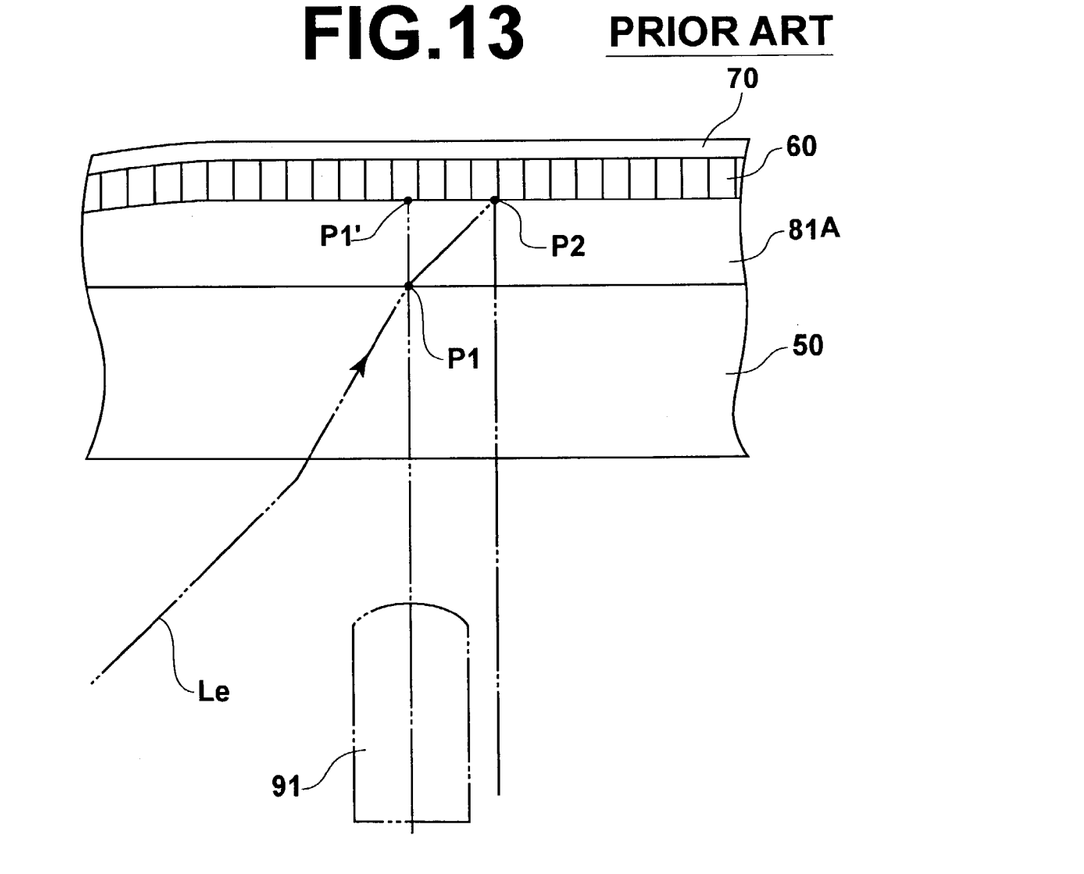
FIG. 13 is an explanatory side sectional view showing how a radiation image is read out from a distorted stimulable phosphor layer.

FIG. 7A is a schematic plan view showing a fifth embodiment of the stimulable phosphor panel in accordance with the present invention, which is provided with a variable capacity mechanism. FIG. 7B is a sectional view taken on line IV—IV of FIG. 7A. FIG. 8 is a schematic plan view showing a sixth embodiment of the stimulable phosphor panel in accordance with the present invention, which is provided with a variable capacity mechanism located so as to pass through a spacer frame. FIG. 9 is a schematic plan view showing a seventh embodiment of the stimulable phosphor panel in accordance with the present invention, which is provided with an expansible and contractible bag-shaped member located so as to pass through a spacer frame. FIG. 12 is an explanatory side sectional view showing a conventional stimulable phosphor panel in a state, in which a spacing between a stimulable phosphor layer and a glass substrate has become large. FIG. 13 is an explanatory side sectional view showing how a radiation image is read out from a distorted stimulable phosphor layer.

With reference to FIGS. 7A and 7B, a stimulable phosphor panel 105, which is the fifth embodiment of the stimulable phosphor panel in accordance with the present invention, comprises a glass substrate 50 having rigidity, a stimulable phosphor layer 60, and a glass plate 70 acting as a transparent water vapor proof cover, which are overlaid one upon another in this order. The stimulable phosphor layer 60 is accommodated and sealed within an enclosed region 80, which is enclosed between the substrate 50 and the glass plate 70. Further, the stimulable phosphor panel 105 is provided with an expansible and contractible buffer space 83, which is in communication with the enclosed region 80.

The area of the overlaying surface of the glass substrate 50 and the area of the overlaying surface of the glass plate 70 are larger than the area of the overlaying surface of the stimulable phosphor layer 60. Peripheral areas 51, 51, . . . of the glass substrate 50 and peripheral areas 72, 72, . . . of the glass plate 70 are adhered to each other via a spacer frame 82, which has a quadrangular frame shape corresponding to the entire shape of the peripheral areas 51, 51, . . . and is constituted of a glass material, or the like, having a thickness approximately identical with the thickness of the stimulable phosphor layer 60. In this manner, the enclosed region 80 is formed between the glass substrate 50 and the glass plate 70.

The stimulable phosphor layer 60 has been formed on a surface of the glass plate 70 with a vacuum evaporation technique or a coating technique. The surface of the stimulable phosphor layer 60, which surface is opposite to the surface that stands facing the glass plate 70, is in close contact with the inner surface of the glass substrate 50. In this manner, a close contact interfacial boundary 81 is formed between the stimulable phosphor layer 60 and the glass substrate 50.

The glass substrate 50 has a communication hole 52, which passes through the glass substrate 50 in the direction normal to the surface of the glass substrate 50. Therefore, the gas contained in the enclosed region 80 is capable of moving through the communication hole 52 into the buffer space 83.

The buffer space 83 is formed by a variable capacity mechanism 86, which has the water vapor proof characteristics and comprises a piston 84 and a cylinder 85. A top area of the opening of the cylinder 85 is in communication with the communication hole 52, which passes through the glass substrate 50. The volume of the buffer space 83 formed within the variable capacity mechanism 86 in the state, in which the buffer space 83 is filled with the gas, takes a value two times as large as the volume of the space within the enclosed region 80. The variable capacity mechanism 86 is set such that, at the normal temperature and the normal pressure (i.e., 20° C. and 1 atm), no gas is contained in the region within the variable capacity mechanism 86.

The buffer space 83 and the space within the enclosed region 80 are filled with dry air or an inert gas.

The volume of the buffer space 83 and the volume of the space within the enclosed region 80 will be described hereinbelow.

The volume of the space within the enclosed region 80 is equal to the sum of the value, which is obtained by subtracting the volume of the stimulable phosphor layer 60 from the volume of the enclosed region 80, and the value of the total volume of voids, which are contained within the stimulable phosphor layer 60.

In this embodiment, the stimulable phosphor layer 60 has a size of 430 mm (vertical length)×430 mm (horizontal length)×0.5 mm (height). Therefore, the volume of the stimulable phosphor layer 60 is equal to 92.45 $cm^3$. Also, the volume of the enclosed region 80, i.e. the volume of the region having a regular quadrangular prism shape, is equal to approximately 100 $cm^3$. Therefore, the value, which is obtained by subtracting the volume of the stimulable phosphor layer 60 from the volume of the enclosed region 80, is equal to approximately 7.5 $cm^3$. Also, the total volume of the voids, which are contained within the stimulable phosphor layer 60, occupies approximately 10% of the volume of the stimulable phosphor layer 60. Therefore, the total volume of the voids is equal to approximately 9.2 $cm^3$.

Accordingly, the volume of the space within the enclosed region 80 is equal to 7.5 $cm^3$+9.2 $cm^3$=16.7 $cm^3$.

The volume of the buffer space 83 is the volume of the region within the variable capacity mechanism 86 in the state, in which the region within the variable capacity mechanism 86 has been filled with the gas. The volume of the buffer space 83 is approximately two times as large as the volume of the space within the enclosed region 80, i.e. is equal to approximately 33 $cm^3$.

The effects of the aforesaid fifth embodiment of the stimulable phosphor panel in accordance with the present invention will be described hereinbelow. In this case, the stimulating rays are irradiated to the stimulable phosphor panel 105 from the side of the glass substrate 50, and the light emitted by the stimulable phosphor layer 60 of the stimulable phosphor panel 105, on which a radiation image has been stored, is detected from the side of the glass substrate 50.

The stimulating rays are irradiated via the glass substrate 50 to the stimulable phosphor layer 60, and the stimulable phosphor layer 60 is stimulated by the stimulating rays to emit the light. The light emitted by the stimulable phosphor layer 60 passes through the close contact interfacial boundary 81 and the glass substrate 50 and emanates to ambient air B. The emitted light is detected by detection means, and an image signal representing the radiation image having been stored on the stimulable phosphor layer 60 is thus acquired.

Effects of the expansible and contractible buffer space 83 will be described hereinbelow.

By way of example, in cases where the stimulable phosphor panel 105 is used at the high ground 2,500 m above the sea level, the pressure of the ambient atmosphere is equal to approximately 0.7 atm. In cases where the stimulable phosphor panel 105 is used under the condition of a temperature of 60° C. at the high ground, the gas contained in the enclosed region 80 is expanded to a volume approximately 1.6 times as large as the volume, which the gas takes in cases where the stimulable phosphor panel 105 is used under the conditions of the normal pressure and the normal temperature. However, the increase in gas volume due to the expansion of the gas within the enclosed region 80 is absorbed by movement of the gas into the variable capacity mechanism 86. Therefore, the pressure within the enclosed region 80 is kept at approximately 0.7 atm in accordance with the pressure of the ambient atmosphere. At this time, the gas described above is taken into the buffer space 83 formed within the variable capacity mechanism 86, and the piston 84 is moved in the direction heading toward the exterior of the variable capacity mechanism 86.

However, in cases where the stimulable phosphor panel is not provided with the variable capacity mechanism 86 for forming the buffer space 83 and is used in the same environment as the environment described above, i.e. under the conditions of the pressure of the ambient atmosphere of approximately 0.7 atm and a temperature of 60° C., the problems described below occur. Specifically, the space within the enclosed region 80 comes into a pressurized state with respect to the ambient air B, and the gas contained in the enclosed region 80 is expanded. As a result, as illustrated in FIG. 12, the spacing between the glass substrate 50 and the stimulable phosphor layer 60 becomes large, and a space 81A occurs between the glass substrate 50 and the stimulable phosphor layer 60. Therefore, the glass plate 70 and the stimulable phosphor layer 60, which is overlaid on the glass plate 70, are deformed.

In the state described above, the stimulating rays are irradiated via the glass substrate 50 to the stimulable phosphor layer 60 for the readout of the radiation image from the stimulable phosphor panel. In such cases, as illustrated in FIG. 13, the stimulating rays Le impinge upon a position P2 on the distorted stimulable phosphor layer 60, the position P2 being shifted from a predetermined position P1, upon which the stimulating rays Le impinge in cases where the stimulable phosphor layer 60 has not been distorted. Also, the stimulating rays Le, which are to be irradiated to the predetermined position P1 on the stimulable phosphor layer 60 having not been distorted (i.e., a position P1' on the distorted stimulable phosphor layer 60), impinge upon the position P2 on the distorted stimulable phosphor layer 60, which position P2 is shifted from the predetermined position P1, and the light emitted from the position P2 is detected by detecting means 91, which has been set so as to detect the light emitted from the predetermined position P1. As a result, the efficiency, with which the emitted light is collected by the detecting means 91, becomes low. Further, since the light emission position alters to the position P2 shifted from the predetermined position P1' (the predetermined position P1) on the stimulable phosphor layer 60, the radiation image represented by the image signal acquired from the shifted position P2 becomes a distorted image. Furthermore, as described above with reference to FIG. 11, since the spacing between the glass substrate 50 and the stimulable phosphor layer 60 becomes large, the image sharpness of the obtained image becomes low.

As described above, with the aforesaid embodiments of the stimulable phosphor panel in accordance with the present invention, the water vapor absorption of the stimulable phosphor layer is capable of being prevented from occurring. Also, even in cases where a change in ambient temperature or atmospheric pressure occurs, the stimulable phosphor layer does not become deformed, and the spacing between adjacent layers constituting the stimulable phosphor panel does not become large. Therefore, a lowering of quality of the image signal read out from the stimulable phosphor layer is capable of being suppressed.

In the fifth embodiment described above, as illustrated in FIG. 7B, the variable capacity mechanism 86 is located so as to pass through the glass substrate 50. Alternatively, as in a stimulable phosphor panel 106 illustrated in FIG. 8, which is a sixth embodiment of the stimulable phosphor panel in accordance with the present invention, the stimulable phosphor panel may be provided with a variable capacity mechanism 87, which is located so as to pass through the spacer frame 82.

Also, as in a stimulable phosphor panel 107 illustrated in FIG. 9, which is a seventh embodiment of the stimulable phosphor panel in accordance with the present invention, an expansible and contractible bag-shaped member 88 maybe employed in lieu of the variable capacity mechanism described above.

Further, the fifth embodiment described above is set such that, under the conditions of the normal pressure and the normal pressure, no gas is contained in the variable capacity mechanism 86. Alternatively, the stimulable phosphor panel may be set such that, under the conditions of the normal pressure and the normal pressure, the gas is contained in the variable capacity mechanism 86. In such cases, the problems are capable of being prevented from occurring in that, when the pressure of the ambient atmosphere becomes high, and when the temperature of the stimulable phosphor panel becomes lower than the normal temperature, the volume of the buffer space 83 of the variable capacity mechanism 86 becomes small, and the pressure within the enclosed region 80 becomes a negative pressure with respect to the external pressure.

In the embodiments described above, in cases where the radiation image is to be recorded on the stimulable phosphor panel, the radiation is irradiated via the transparent water vapor proof cover to the stimulable phosphor layer.

It is sufficient for the buffer space to have a volume falling within the range of $1/10$ times as large as the volume of the space within the enclosed region to two times as large as the volume of the space within the enclosed region. The buffer space is not limited to the space within the bag-shaped area, the variable capacity mechanism comprising the cylinder and the piston, or the bag-shaped member. Also, such that the effect of suppressing the lowering of the quality of the read-out image signal may be obtained more reliably in cases where a change in temperature and atmospheric pressure occurs, the buffer space should preferably have a volume falling within the range of one times as large as the volume of the space within the enclosed region to two times as large as the volume of the space within the enclosed region.

Further, the enclosed region need not necessarily be filled with dry air or an inert gas and may be filled with ordinary air. In such cases, as in the cases described above, the effect of suppressing the lowering of the quality of the read-out image signal is capable of being obtained.

What is claimed is:

1. A stimulable phosphor panel, comprising:
   i) a substrate having rigidity,
   ii) a stimulable phosphor layer, and
   iii) a transparent water vapor proof cover,
   the substrate, the stimulable phosphor layer, and the transparent water vapor proof cover being overlaid one upon another in this order,
   the stimulable phosphor layer being accommodated and sealed within an enclosed region, which is enclosed between the substrate and the transparent water vapor proof cover, wherein the improvement comprises the provision of an expansible and contractible buffer spaces individually formed outside the enclosed region, which are in communication with the enclosed region.

2. A stimulable phosphor panel as defined in claim 1 wherein the buffer space has a volume falling within the range of ($1/10$) times as large as the volume of the space within the enclosed region to two times as large as the volume of the space within the enclosed region.

3. A stimulable phosphor panel as defined in claim 2 wherein the transparent water vapor proof cover is constituted of a deformable film, and the buffer space is formed by the utilization of a certain area of the transparent water vapor proof cover.

4. A stimulable phosphor panel as defined in claim 3 wherein the buffer space and the space within the enclosed region are filled with dry air or an inert gas.

5. A stimulable phosphor panel as defined in claim 2 wherein the buffer space is formed by a variable capacity cylinder, which has water vapor proof characteristics, or an expansible and contractible bag-shaped member, which has water vapor proof characteristics.

6. A stimulable phosphor panel as defined in claim 5 wherein the buffer space and the space within the enclosed region are filled with dry air or an inert gas.

7. A stimulable phosphor panel as defined in claim 2 wherein the buffer space and the space within the enclosed region are filled with dry air or an inert gas.

8. A stimulable phosphor panel as defined in claim 1 wherein the transparent water vapor proof cover is constituted of a deformable film, and the buffer space is formed by the utilization of a certain area of the transparent water vapor proof cover.

9. A stimulable phosphor panel as defined in claim 8 wherein the buffer space and the space within the enclosed region are filled with dry air or an inert gas.

10. A stimulable phosphor panel according to claim 8, wherein the buffer space is formed by an indentation within the water vapor proof cover.

11. A stimulable phosphor panel as defined in claim 1 wherein the buffer space is formed by a variable capacity cylinder, which has water vapor proof characteristics, or an expansible and contractible bag-shaped member, which has water vapor proof characteristics.

12. A stimulable phosphor panel as defined in claim 11 wherein the buffer space and the space within the enclosed region are filled with dry air or an inert gas.

13. A stimulable phosphor panel as defined in claim 1 wherein the buffer space and the space within the enclosed region are filled with dry air or an inert gas.

14. A stimulable phosphor panel according to claim 1, wherein a plurality of buffer spaces are disposed throughout the stimulable phosphor panel.

15. A stimulable phosphor panel according to claim 14, wherein the plurality of buffer spaces are disposed at the corners of the stimulable phosphor panel.

16. A stimulable phosphor panel according to claim 1, further comprising a communication hole disposed within the substrate leading to a buffer space disposed external to the stimulable phosphor panel.

17. A stimulable phosphor panel according to claim 1, wherein said buffer space is void of gas during a normal temperature and pressure.

18. The stimulable phosphor panel according to claim 1, wherein the buffer spaces absorb a reduction or an increase of a gas accommodated in the enclosed region, by increasing or decreasing a capacity of the buffer spaces.

19. The stimulable phosphor panel according to claim 1, wherein a capacity of the buffer spaces is increased or decreased when differential pressure is present between an outside area and an inside are of the enclosed region, which maintains the capacity of the enclosed region at a constant.

20. A stimulable phosphor panel, comprising:

a substrate having rigidity;

a stimulable phosphor layer;

a transparent water vapor proof cover; and an expansible and contractible buffer space;

wherein the substrate, the stimulable phosphor layer, and the transparent water vapor proof cover being overlaid one upon another in this order, wherein the stimulable phosphor layer is accommodated and sealed within an enclosed region, which is enclosed between the substrate and the transparent water vapor proof cover, and wherein the buffer space is in communication with the enclosed region and absorbs a chance in a volume of the enclosed region, and a plurality of expansible and contractible buffer spaces which are individually formed outside the enclosed region and are in communication with the enclosed region and absorb a change in a volume of the enclosed region.

21. A stimulable phosphor panel, comprising:

a substrate having rigidity, a stimulable phosphor layer, and a transparent water vapor proof cover, the substrate, the stimulable phosphor layer, and the transparent water vapor proof cover being overlaid one upon another in this order, the stimulable phosphor layer being accommodated and sealed within an enclosed region, which is enclosed between the substrate and the transparent water vapor proof cover, comprising at least one expansible and contractible buffer space separately formed outside the enclosed region, which is in communication with the enclosed region.

* * * * *